United States Patent
Nordby

[19]
[11] Patent Number: 5,818,194
[45] Date of Patent: Oct. 6, 1998

[54] DIRECT REPLACEMENT VARIABLE SPEED BLOWER MOTOR

[75] Inventor: Craig J. Nordby, Chesterfield, Mo.

[73] Assignee: Emerson Electric Co., St. Louis, Mo.

[21] Appl. No.: 626,035

[22] Filed: Apr. 1, 1996

[51] Int. Cl.⁶ ..................................................... H02P 1/46
[52] U.S. Cl. .......................... 318/101; 318/105; 318/106; 318/107; 318/108
[58] Field of Search ........................... 318/701, 105–110, 318/441, 442, 3, 727, 779, 772, 812, 268; 307/64, 66, 117; 165/245, 236

[56] References Cited

U.S. PATENT DOCUMENTS

| | | |
|---|---|---|
| 4,227,128 | 10/1980 | Cockroft et al. . |
| 4,357,988 | 11/1982 | Hudson et al. ............................ 165/26 |
| 4,484,122 | 11/1984 | Day et al. . |
| 4,554,496 | 11/1985 | Rudich, Jr. et al. . |
| 4,585,163 | 4/1986 | Cooley et al. . |
| 4,644,238 | 2/1987 | Hirosaki . |
| 4,707,646 | 11/1987 | Thompson et al. . |
| 5,184,026 | 2/1993 | O Breartuin . |
| 5,197,667 | 3/1993 | Bowsky et al. . |
| 5,397,970 | 3/1995 | Rowlette et al. . |
| 5,410,230 | 4/1995 | Bessler et al. . |
| 5,418,438 | 5/1995 | Hollenbeck . |
| 5,448,141 | 9/1995 | Kelley et al. . |
| 5,492,273 | 2/1996 | Shah .......................................... 236/44 |

*Primary Examiner*—William M. Shoop, Jr.
*Assistant Examiner*—Kim Lockett
*Attorney, Agent, or Firm*—Howell & Haferkamp, L.C.

[57] ABSTRACT

A blower motor unit having a variable speed motor and that is suitable for direct, drop-in replacement in a residential HVAC (heating, ventilation, and air conditioning) system that employs a PSC motor. The blower motor unit is provided with a neutral input and two hot AC line connections, one for connection to the heating power source and the other to the cooling power source. The blower motor unit senses which of the inputs is energized by sensing either voltage or current on at least one of the inputs, selects one of at least two reference signals in accordance with which input is energized, and presents the control input of the replacement variable speed motor with the selected reference signal, thereby controlling the speed of the variable speed motor. This motor control unit, and the method by which it selects one of two signals for application to a control input of a motor, are also independently useful to control any type of motor having at least two modes of operation.

46 Claims, 6 Drawing Sheets

FIG. 9

DIRECT REPLACEMENT VARIABLE SPEED BLOWER MOTOR

BACKGROUND OF THE INVENTION

1. Field of the Invention

This invention relates to motor controls used in residential heating, ventilation, and air conditioning (HVAC) systems, and more particularly to a direct replacement motor control having an improved variable speed control and which is designed to be connected to the standard power terminals used for a permanent split capacitor (PSC) motor, while eliminating the need for extra control signals and also to a method of controlling a variable-speed motor.

2. Brief Description of the Prior Art

Blower motors used in residential HVAC systems traditionally use PSC motors. These motors generally have two independent power connections to accommodate heating or cooling modes of operation. The heating or cooling power inputs are normally connected to different winding taps in the PSC motor to provide somewhat different operating speeds for the blower in the respective modes of operation. More than two sets of taps can be designed into the PSC motor, allowing the OEM or installer to select the operating speed by appropriate connection of the taps to the respective heating and cooling power connections. The energizing of these AC power connections to the motor is controlled by activation of a temperature switch and a relay driven from the thermostat.

Figure 1:
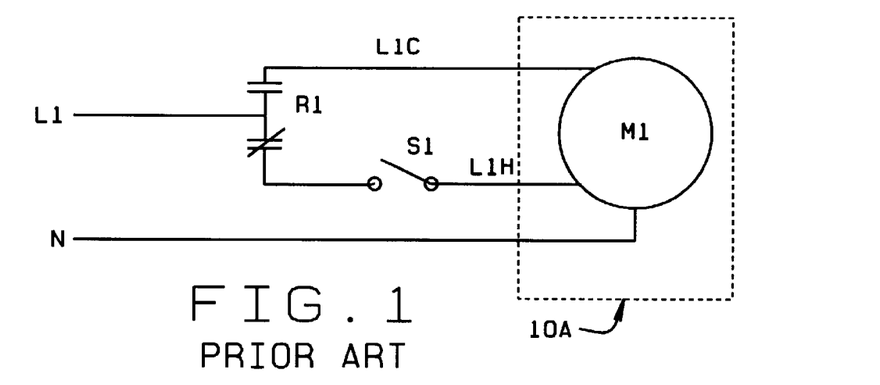
FIG. 1 is a schematic circuit of a prior art HVAC system.

A typical configuration of a fixed speed HVAC motor used in residential systems is shown in FIG. 1. In this configuration, the single phase AC supply voltage (normally 115 VAC or 230 VAC) is supplied by connections L1 and N, where L1 represents the hot side of the AC supply, and N is the neutral, which is at earth potential in a typical 115 VAC residential distribution system. (In normal 230 VAC systems, instead of a neutral line N, another hot supply line would be substituted, instead.) The power to the motor is controlled by a relay R1 and a switch S1. In FIG. 1, relay R1 and switch S1 are both shown in their non-energized positions.

The blower relay is controlled by the thermostat. In the position shown in FIG. 1, which is the normal position for the heating mode of operation, AC voltage is supplied to the L1H motor connection any time fan control switch S1 closes. The fan control switch S1 closes whenever the air temperature in the heat exchanger exceeds a predetermined setpoint. For a gas furnace system, this happens when the gas burner is activated by signals from a thermostat. When fan control switch S1 closes, AC power is supplied to the motor M1, which will then start and run. The speed of motor M1 is a function of motor design, tap selection in the motor, blower characteristics and the aerodynamic system impedance. Motor M1 stops when fan control switch S1 turns off, whenever the heat exchanger air temperature decreases below the setpoint.

Similarly, when the thermostat demands blower operation because of cooling demand, blower relay R1 closes and energizes the L1C motor connection. This is the motor winding tap corresponding to cooling operation. When energized, motor M1 starts and operates. Blower operation ceases when signals from the thermostat de-energize blower relay R1.

The discussion to this point has concerned fixed speed motors, or multiple-speed motors, the speeds of which are controlled by the selection of taps on the motor winding.

Figure 2:
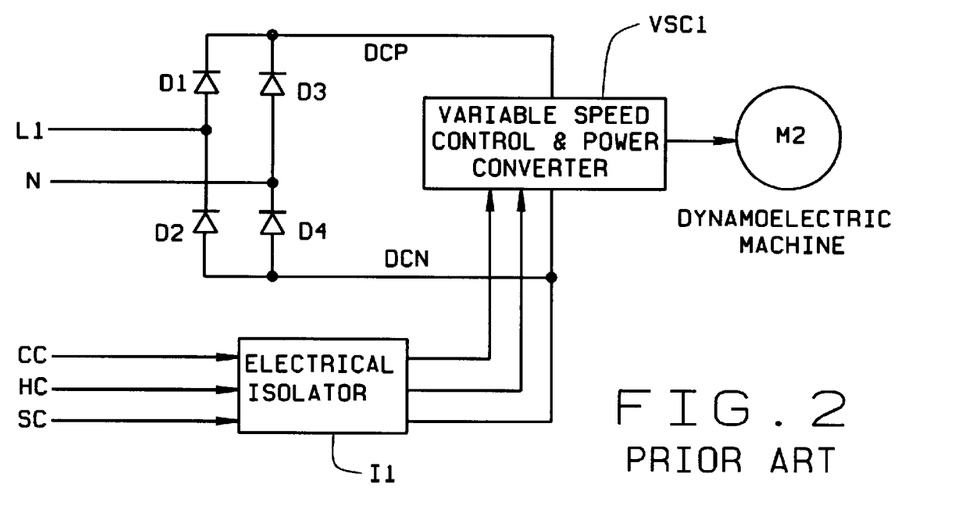
FIG. 2 is a schematic circuit of a prior art variable speed motor control system showing increased complexity as compared to FIG. 1 as well as the need for isolation of control signals.

Today, state-of-the art HVAC systems use electronic variable speed motor controllers. The standard approach for implementing variable speed motors is different from and generally more complex than the system used for fixed speed motors. A typical interconnection diagram for a variable speed motor system is shown in FIG. 2. Single phase AC power is supplied through a connection of L1 and N. This power is rectified via a full-wave bridge rectifier circuit comprising diodes D1, D2, D3, and D4 to supply a DC bus voltage to a converter module VSC1. The DC positive voltage is supplied at DCP, while the DC negative voltage is supplied at DCN. The variable speed control and power converter module VSC1 transforms the DC potential into the appropriate output voltage and current waveforms for the dynamoelectric machine M2. An important consideration is that common for the control circuitry for power converter VSC1 is connected to the negative DC bus DCN to simplify the voltage and current sensing circuitry, and for ease of implementing the power semiconductor driver circuitry in VSC1. The system common SC (as distinguished from the common of power converter VSC1) is generally connected to earth ground.

Control signals (in addition to power connections) are fed into the power converter VSC1 through an electrical isolator I1 and typically include cool and heat commands on separate connections CC and HC, respectively. A thermostat or other type of system controller (not shown in FIG. 2) supplies these signals, which are normally 24 VAC or less. A variety of electrical protocols may be used, e.g., 24 VAC on-off signals from the thermostat, or 5 or 12 V discrete logic signals from an electronic system controller. The common potential (system common SC) for these signals is at earth ground for safety reasons, which means that there is a potential difference between the command signals appearing at CC and HC and the variable speed control and power converter VSC1 circuits, the latter being referenced to the DCN potential. These two commons cannot be connected (shorted), so an electrical isolation module I1 is provided to couple the control signals at CC and HC to power converter VSC1, while isolating the potential between the two sets of circuits.

While variable speed systems similar to the one illustrated in FIG. 2 work satisfactorily, changing a standard fixed speed motor in a system of a type similar to that illustrated in FIG. 1 has required changes in the mechanical, wiring, or control configuration of the system. The difficulty and expense of making such changes has made it impractical, in many installations, to realize the energy efficiency and comfort advantages that may be realized through the use of variable speed motor technology in an HVAC system. It would therefore be desirable to provide a "drop in" replacement of a PSC motor in an HVAC system to realize these advantages without requiring changes to the HVAC system. It would further be advantageous to reduce the cost of such replacement systems by utilizing simple control circuits and eliminating the need for additional wiring, such as that used in conjunction with traditional variable speed motors.

SUMMARY OF THE INVENTION

The present invention provides a variable speed control suitable for replacement use in an HVAC system comprising a power input which itself comprises a first and a second current input for coupling to a variable speed motor so that an operating current applied to either of the two current input supplies operating power for the motor; a multiplexing unit for selecting one of at least a pair of reference signals for application to a reference input of the variable speed motor, the selection depending upon which of the first and the second current inputs is supplying operating power to the motor; and a reference source for supplying the at least a pair of reference signals to the multiplexing unit. The multiplexing unit may comprise a power source sensor which may be either a voltage (potential) sensing unit or a current flow sensing unit. As will be described in detail below, whether a voltage or a current sensing unit is provided, significant accuracy is not required, so the cost of the sensing circuitry can be made quite low. When this circuitry is provided with a variable speed motor having dimensions similar to that of a standard PSC motor used in residential HVAC systems, the resulting variable speed blower motor replacement unit can be used as a "drop-in" replacement for the PSC motor, in that the replacement unit requires only the same electrical connections as the original PSC motor.

It should be understood that the term "current input" refers to a connection on the device that can be connected to a current source. However, it should also be understood that it could alternately be connected to any source capable of supplying power to the motor. For example, a "current input" could be connected to a voltage source capable of supplying the necessary power to run the motor. Of course, it will be understood that current would be drawn from the voltage source to supply the necessary power to run the motor. For notational convenience, the term "power input" is used to refer to the set of "current inputs."

It should also be understood that this invention is not limited to replacement use, but may also be used in OEM applications.

It is therefore an object of the present invention to provide a low-cost variable speed replacement unit for a standard fixed speed motor of the type used in a residential HVAC system.

It is also an object of the invention to provide a replacement variable speed control system in an HVAC system without requiring changes to mechanical configurations, wiring, or control of the HVAC system.

It is a still further object of the invention to provide an after-market variable speed unit that may be used as a drop-in replacement for a PSC motor.

It is yet another object of the invention to provide a drop-in replacement of a PSC motor in an HVAC system that will realize the efficiency and comfort advantages of variable speed motor control in HVAC systems.

It is yet an additional object of the invention to provide a variable speed replacement unit for a PSC motor that utilizes simple control circuits and reduces or eliminates the need for the additional wiring commonly used with variable speed motors.

It is still another object of the invention to provide an alternative to a PSC motor in HVAC systems to provide for better performance in such systems by providing variable-speed operation.

These and other objects will become apparent to one skilled in the art upon reading the detailed description of the invention below.

DETAILED DESCRIPTION OF THE PREFERRED EMBODIMENTS

Figure 3:
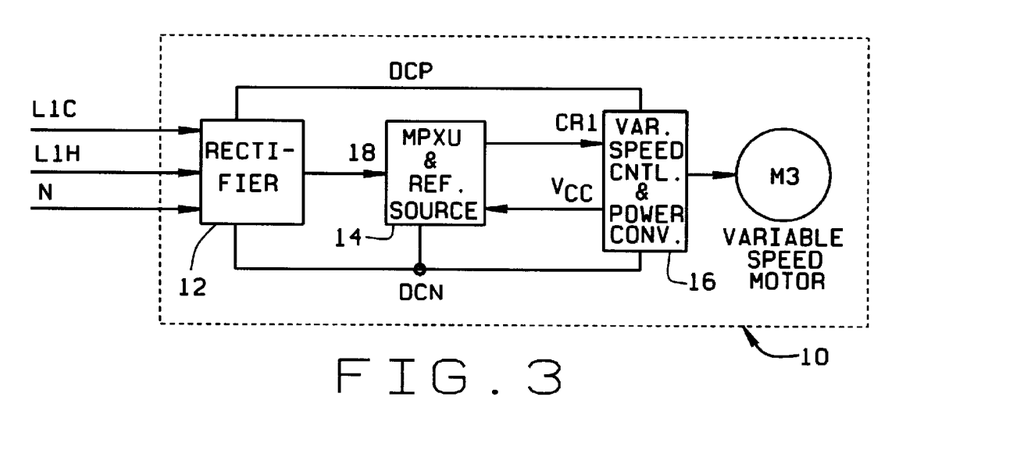
FIG. 3 is a schematic block diagram of an embodiment of the invention.

Referring now to FIG. 3, an embodiment of the invention is shown generally at 10, shown here as a drop-in replacement for that portion of FIG. 1 enclosed by the rectangle 10A. The embodiment 10 of the invention in FIG. 3 comprises a rectifier 12, a system 14 which includes a multiplexing unit and a reference source, and a variable speed motor M3. A standard variable speed control and power converter 16 provides variable speed operation for motor M3 and may be considered as a part of that motor for the purposes of this invention. Power to the embodiment 10 shown in FIG. 1 is provided via the same set of connections provided to a PSC motor, i.e., L1C, L1H and neutral N, as shown in FIG. 3, as would be expected for a drop-in replacement element. (It is convenient, from the standpoint of terminology, to refer collectively to this set of connections as a "power input.") Of course, it will be recognized that the inventive motor speed control system comprising elements 12, 14 and 16 is separately useful without the motor, both for OEM and for replacement use, such as for use with any suitable motor M3.

In accordance with the invention, at least one signal from an AC source (connected to either L1C or L1H) is sensed and converted to a logic level signal. Voltage (potential) sensing may be used, or alternately, current (flow) sensing may be used. Since the sensing scheme is used only to detect the presence or absence of voltage or current on the sensed line and does not require any significant accuracy, the cost of either type of sense circuitry can be made very low.

Figure 4:
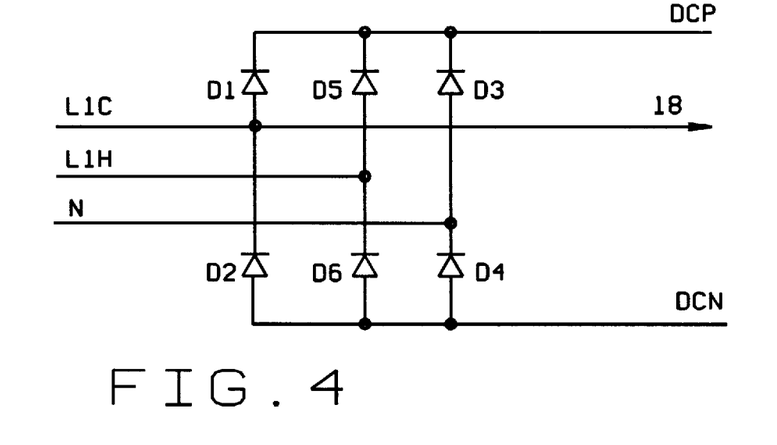
FIG. 4 is a schematic diagram of a modified rectifier circuit suitable for use with the invention.

For voltage sensing, the input rectifier 12 must be modified to decouple the power sources, since if they are not decoupled, the L1C and L1H connections would have a tie point, making it impossible to determine the source of the voltage. A means for decoupling the AC supply inputs is to add an additional leg comprising diodes D5, D6 to rectifier 12, as shown in FIG. 4, which is a more detailed schematic representation of rectifier 12 in FIG. 3. This additional leg decouples power sources L1C and L1H, thus allowing the sensing circuitry 14 (referring once again to FIG. 3) to determine the source of the input power.

Figure 5:
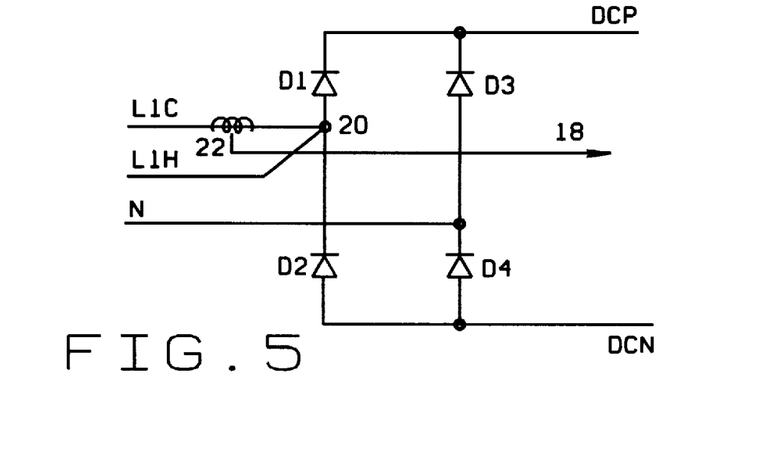
FIG. 5 is a schematic diagram of a current sensing system suitable for use with the invention.

A more detailed schematic representation of rectifier 12 in an embodiment of the invention in which a current sensing circuit is used is shown in FIG. 5. With current sensing, the L1C and L1H inputs are connected together at the input 20 of the rectifier bridge comprising D1, D2, D3, and D4. The current sense point 22 is ahead of connection point 20. It will be recognized that, although sense point 22 is shown here in the L1C input, with appropriate modifications to the multiplexing unit and reference source 14, it could alternately be in the L1H input. The current sensing technique requires no additional bridge diode leg, as does the voltage sensing technique, but does require isolation between the sense point 22 and the common of the control DCN.

Because a blower system characteristically has an output power proportional to the cube of the speed of the motor driving the fan, and since the current sensing technique is sensitive to the power fed to the motor, the current detection level and hysteresis must be selected to ensure that the correct sensing of the AC source is achieved over the operating speed and torque range of the motor. It will also be understood that current sensing can be done by a number of well-known sensing techniques, including, for example, shunt sensors or current transformers.

Figure 6:
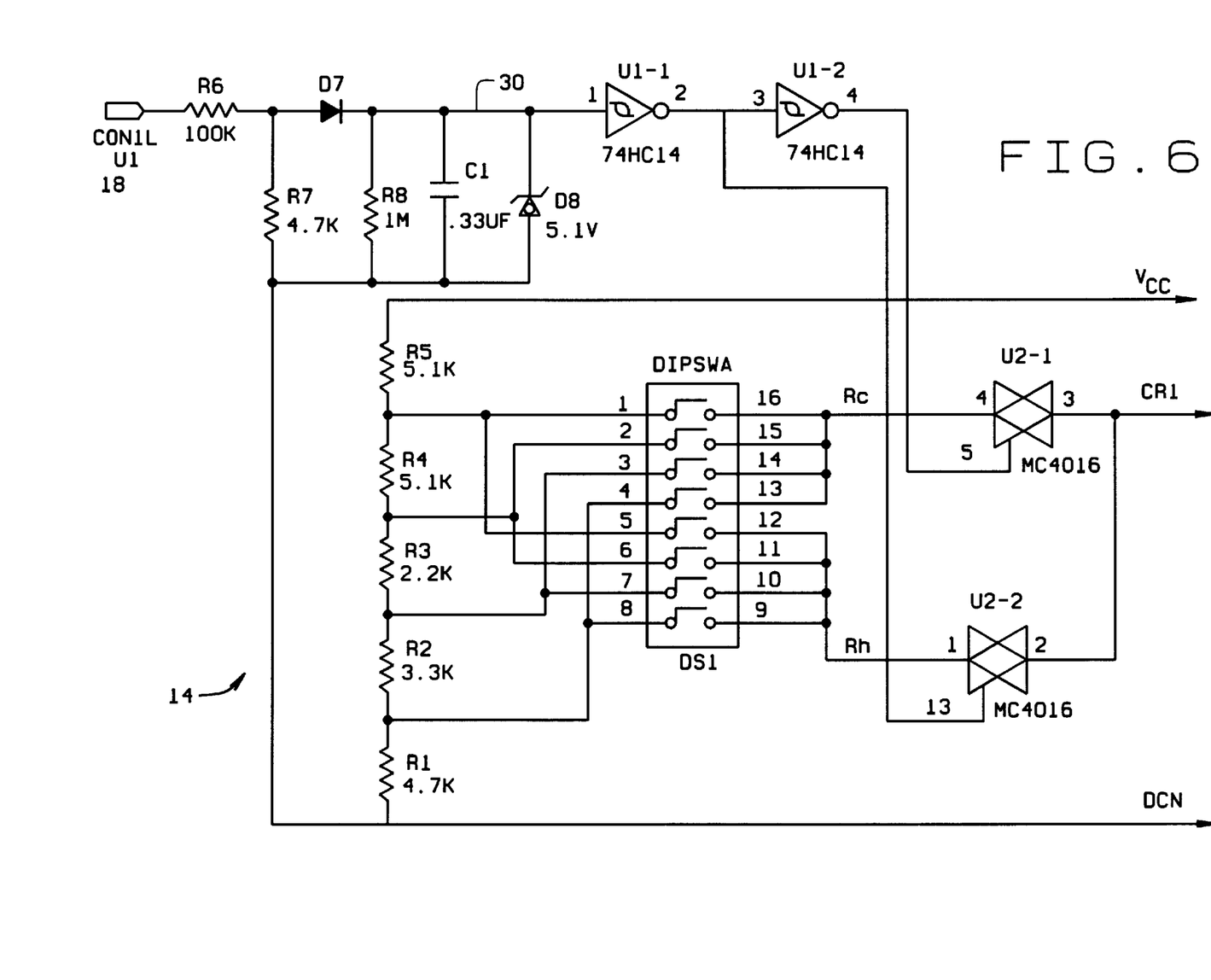
FIG. 6 is a detailed schematic diagram of a voltage sensing and multiplexing unit in accordance with one aspect of the invention.

A detailed schematic of an embodiment of the multiplexing unit and reference source 14 employing voltage sensing is shown in FIG. 6, in which the multiplexing unit comprises a voltage sensor which includes resistors R6, R7, and R8, capacitor C1, and diodes D7 and D8, logic gates U1-1 and U1-2, and analog transmission gates U2-1 and U2-2, and the reference generator comprises a resistive voltage divider network R1–R5 and switch network DS1. The potential (with respect to DCN) at 18, when voltage is sensed, is a half-wave sinusoid with the same magnitude as the AC supply voltage. The signal at 18 is fed to a network comprising resistors R6 and R7, diodes D7 and D8, and capacitor C1. Resistors R6 and R7 form an attenuation network with a ratio of approximately 1/20 for the preferred values of 100K and 4.7K for R6 and R7, respectively. Diode D7 and capacitor C1 form a peak detector. The 1M resistor R8, 0.33 $\mu$F capacitor C1 and diode D8 filter and clamp the attenuated signal to the logic level required for input to gate U1-1, which is a section of a Schmitt trigger invertor gate of type 74HC14. (It will be convenient to denote as a "voltage attenuator/buffer" that portion of the voltage sensing circuity up to, but not including, the logic gates.)

It should be understood that, although one form of voltage attenuation and buffering is illustrated and described here, other implementations are possible, such as embodiments employing capacitive attenuation or transformers. Moreover, alternate implementations of voltage attenuation and buffering may be employed, provided that a signal suitable for application to a logic section (described below) is developed.

The multiplexing unit section of multiplexing unit and reference source 14 includes two invertor gates, U1-1 and U1-2, which, in this embodiment, are independent sections of the invertor gate 74HC14 described above. A Schmitt trigger IC such as this is preferred to reject any ripple from the attenuation and filter network. In the implementation of FIG. 6, the output of gate U1-1 is connected to the input of U1-2, and the output of each drive different and independent sections U2-1 and U2-2, respectively, of an analog transmission gate, such as an MC4016. In this implementation, when AC voltage is present at 18, the output of U1-1 is false (low), and the output of U1-2 is true (high). In this embodiment, this state represents the cooling mode, i.e., the AC source for cooling mode is energized, selector gate U2-1 (the cooling mode selector gate) is enabled, and selector gate U2-2 (the heating mode selector gate) is disabled. In contrast, if voltage is absent at 18, the output of U1-1 is true and the output of U1-2 is false, thereby driving the heating mode selector U2-2 on and the cooling mode selector U2-1 off. Because the outputs of selector gates U2-1 and U2-2 are tied together, their inputs appear multiplexed at CR1.

Because Schmitt triggers U1-1 and U1-2 allow only one of analog transmission gates U2-1 and U2-2 to be enabled at a time, a command reference R* representing either a reference $R_h$ for heating mode or a reference $R_c$ for cooling mode appears at output CR1. In the embodiment illustrated in FIG. 6, the reference source comprises a resistive ladder voltage divider string formed by resistors R1 through R5 and a switch network DS1, which together provide a means to adjust the references and to provide a function equivalent to the winding tap selection in a PSC motor. The setpoint values may be adjusted by appropriately selecting resistor values for resistors R1 through R5, which are connected in series from the command common DCN to a supply voltage $V_{CC}$, which is the low voltage control power supply from the motor control (nominally 5 volts). This supply is also connected to circuits U1 (which includes U1-1 and U1-2) and U2 (which includes U2-1 and U2-2), although this connection is not shown in FIG. 6. $V_{SS}$ for these circuits is the DCN potential, the connection to which is also not shown. Various modifications will be apparent to one skilled in the art if logic requiring other voltages is substituted for that shown in FIG. 6 or if the supply voltages available are different from the power supply voltages required by the logic circuitry.

In the configuration shown, it is contemplated that the set of switches used for switch group DS1 is a DIP switch with 8 independent SPST switches. One of four switches labeled SW1 through SW4 is closed to select the setpoint reference for the cooling reference $R_c$. Similarly, one of the four switches SW5 through SW8 is closed to select the heating reference $R_h$. Thus, in the illustrated embodiment, $R_c$ and $R_h$ can each be selected independently from one of the four alternatives. Although a basic resistor string and switch network is shown, it will be understood that other ladder and switch combinations can be used for this function, and that a greater or lesser number of reference selections can be provided for either or both of the references $R_c$ or $R_h$. Furthermore, while DIP switches may be convenient to use in this application, other types of switches may be substituted.

It will be understood by one skilled in the art that the L1H signal could have been used instead of the L1C signal as the input 18 to multiplexing unit and reference source 14. It will also be recognized that, if the L1H signal is used without making other modifications to the circuit of FIG. 6, the reference labelled $R_c$ in FIG. 6 assumes the role of the heating reference, the reference labelled $R_h$ assumes the role of the cooling reference, and it is only necessary to set the switches on switch block DS1 accordingly to provide the same command references that would have been provided if the L1C had been used. Thus, this circuit can be used with either L1C sensing or L1H sensing without any modification other than changing switch settings.

Returning to FIG. 3, The motor M3 runs whenever AC power is applied to the unit via either L1C or L1H. The command reference R* fed to motor control 16 at CR1 can represent the speed of the motor, but it could represent as an alternative any other control parameter, such as torque or air flow. The output control function is established by the design of motor control 16 and is independent of the invention.

Figure 7:
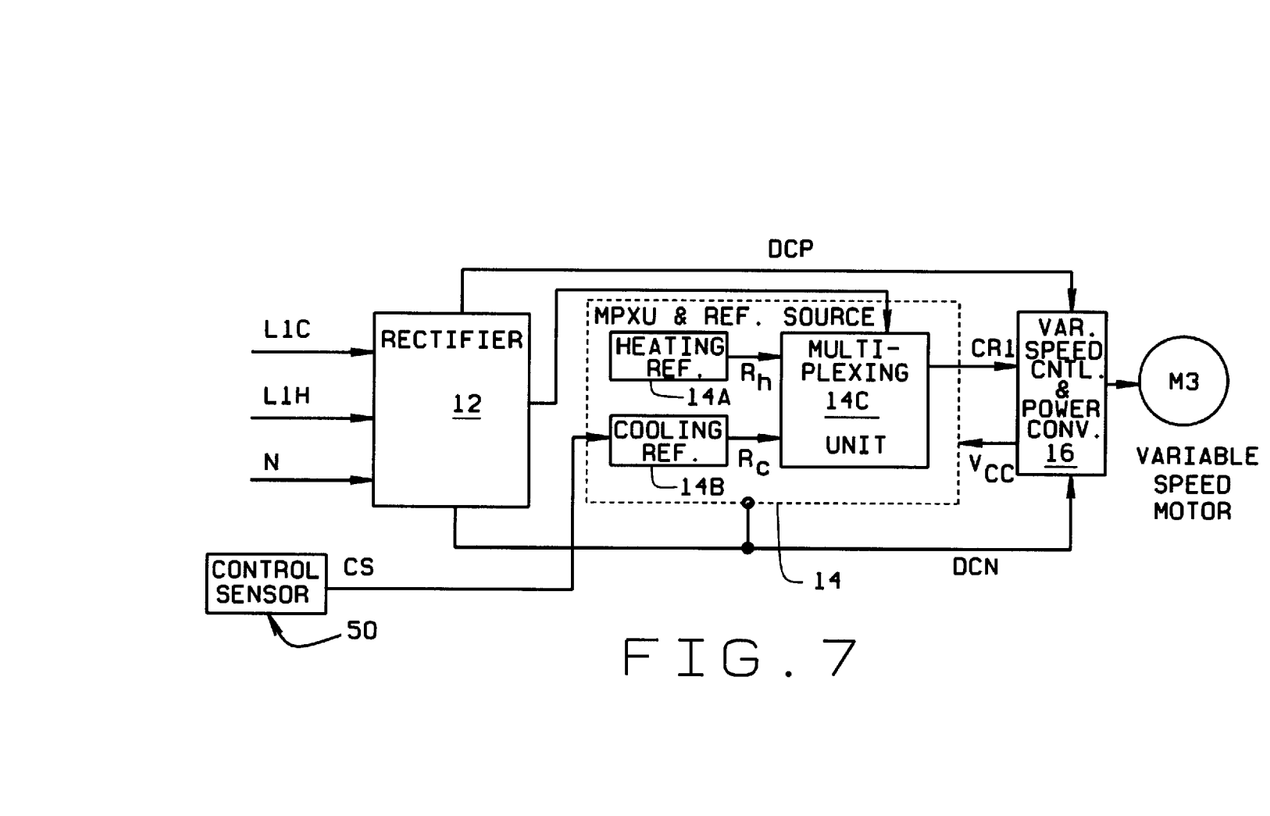
FIG. 7 is a schematic block diagram of an embodiment of the invention employing a function generator to supply a reference signal.

It is contemplated that the invention may be further enhanced by the addition of a time delay circuit to the reference selector to provide the motor on and off delays typically used for HVAC heating and cooling modes. Configurations with more than two AC power sources are possible, as are configurations with external sensors and control systems to further enhance functionality. A block diagram of one such enhanced configuration is shown in FIG. 7. In this configuration, the multiplexing unit and reference source 14 comprises a heating reference 14A, a cooling reference 14B, and a multiplexing unit 14C. The heating reference 14A, for purposes of this example, may be a switch-selected reference deriving a DC reference voltage from a resistive string divider as previously discussed. The cooling reference source 14B of this example receives input CS from a control sensor 50, which could be, for example, a voltage across a thermistor or thermocouple or any other signal that varies with temperature or some other relevant parameter. When applied to reference source 14B, changes in the input CS change the cooling reference output $R_c$ in a predictable way. The cooling reference source 14B may comprise various known circuit elements for developing a known transfer function from the control sensor input CS to reference output $R_c$ (e.g., amplifiers and buffers), so the exact form of reference source 14B is not critical to the invention. For the purposes of this invention, a device having an output that varies predictably in response to changes at its input shall be referred to as a function generator.

While only the cooling reference source 14B is shown as a function generator, either or both of the reference sources 14A and 14B can comprise function generators.

Figure 8:
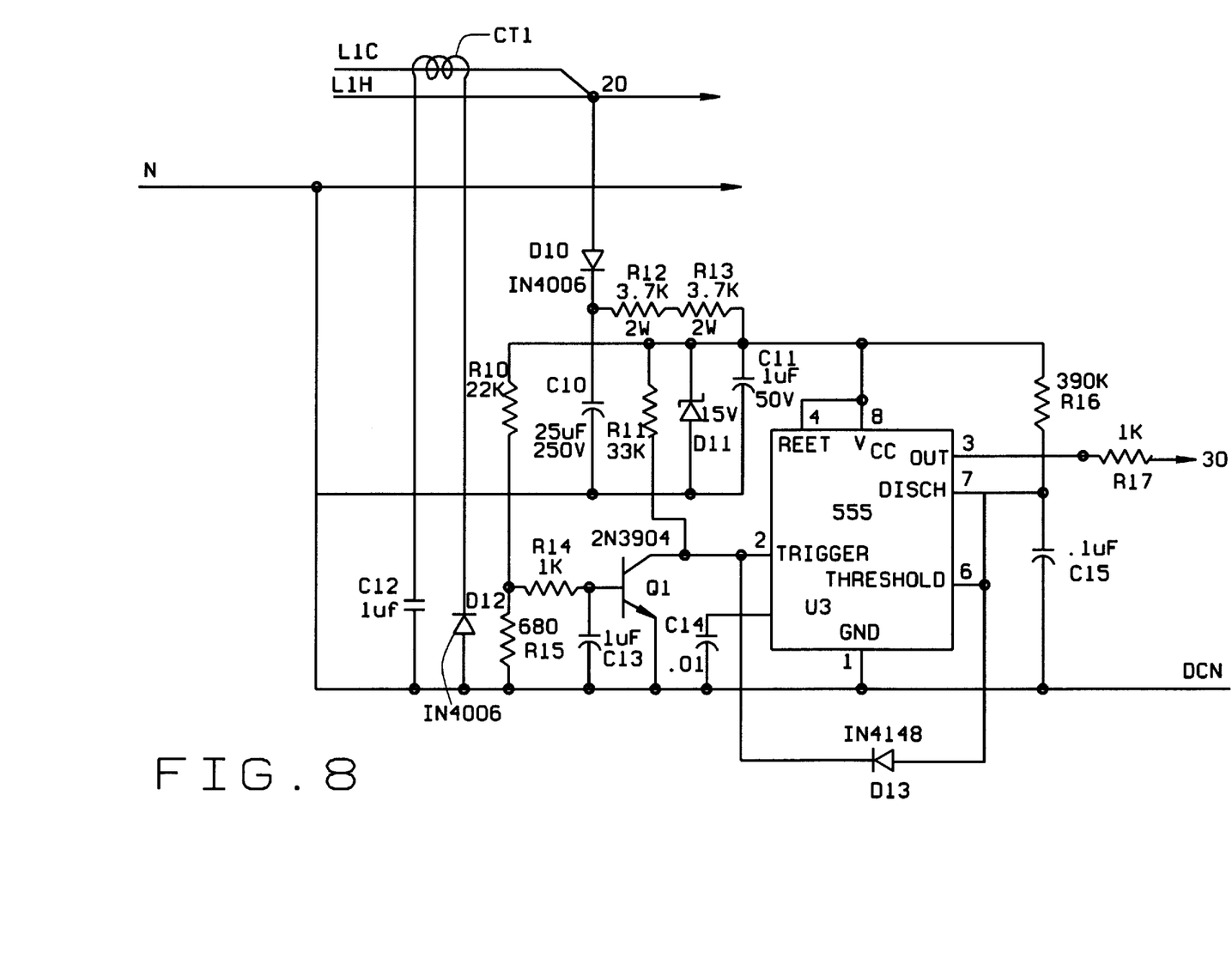
FIG. 8 is a schematic block diagram of a current sensing unit in accordance with another aspect of the invention.

An embodiment of a current sensing element that is suitable for use as a substitute for the voltage sensing circuitry in FIG. 6 is shown schematically in FIG. 8. In this embodiment, transformer CT1 is in cooling line L1C and senses when AC current is flowing in that line. (Transformer CT1 is located at sense point 22 in FIG. 5.) For a 115 VAC input to a typical PSC motor and the circuit shown in FIG. 8, a 50 turn, toroidal core transformer can be used, with the power line going through the center of the transformer. This configuration is not critical, however. One skilled in the art will recognize that other configurations are possible, perhaps requiring obvious circuit modifications. Control power for the circuit is developed when the DCP line is energized, which occurs when either of the L1H or L1C inputs is energized. This control power is developed from a DC power supply which, in the illustrated embodiment, comprises diode D10; 15 volt Zener diode D11; 33K resistor R11; 3.7K, 2 watt resistors R12 and R13; 25 $\mu$F, 250 volt capacitor C10, and 1 $\mu$F, 50 volt capacitor C11. This control power source illustrates one way of eliminating the need for additional connections to existing circuitry for the drop-in unit, but this power source can be omitted entirely if power for the circuitry in FIG. 8 can be obtained from other sources, such as the $V_{CC}$ source shown in FIG. 6, which can be obtained from another section of the drop-in replacement unit.

If either the cooling line or the heating line is energized, current flows through the line to power the motor. If the cooling line is energized, current transformer CT1 senses this current and couples it to the base of transistor Q1, which, in this embodiment, is a 2N3904. The pulses, which occur at the power supply mains frequency of 60 Hz, are amplified by transistor Q1. The collector of transistor Q1 is connected to the trigger input of circuit U3, a 555 timer, and, through D13 (a1N4148 diode), to C15, which is a 0.1 $\mu$F timing capacitor. The pulses at the transistor collector cause the capacitor to be repetitively discharged, in turn causing the output of U3 at line 30 to remain high. Conversely, if input L1H is energized instead of L1C, no pulses are sensed, U3's timing capacitor C15 charges, and the output of U3 at line 30 goes low. It will thus be seen that the circuit of FIG. 8 can be substituted for the voltage sensing elements R6, R7, R8, C1 and D8 in FIG. 6 and, by sensing current instead of voltage, eliminate the need for diodes D5 and D6 in FIG. 4.

It will be readily observed that current transformer CT1 can be placed in the L1H input instead of the L1C input if desired. The switch settings in DS1 will then have to be changed accordingly, since the lines representing references $R_c$ and $R_h$ will be reversed.

Figure 9:
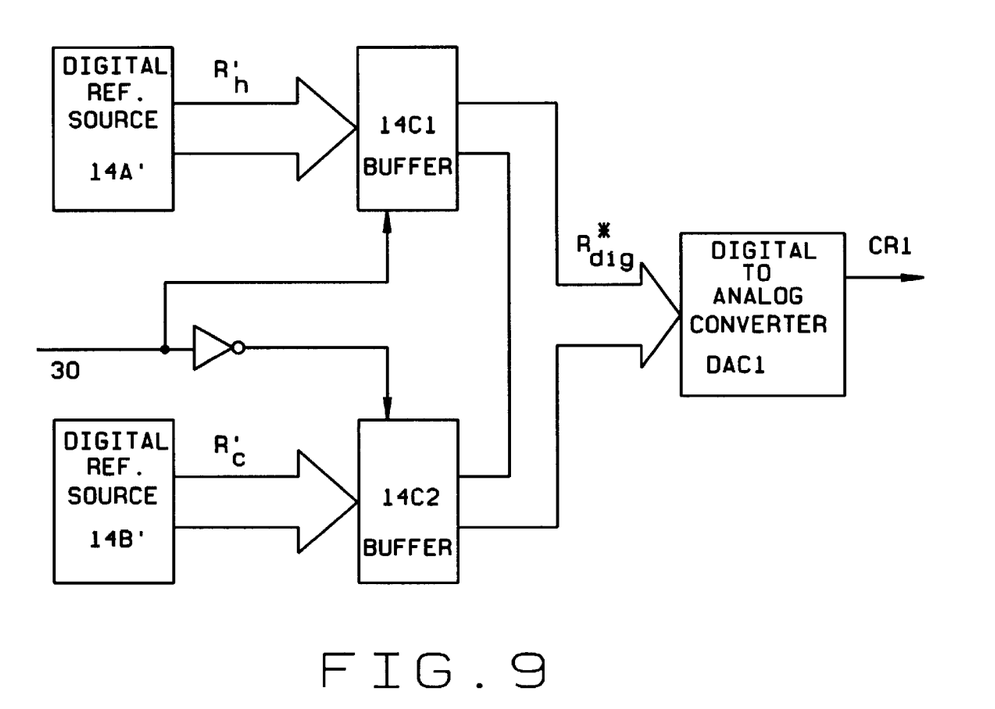
FIG. 9 is a schematic block diagram of a digital reference and multiplexing unit in accordance with another aspect of the invention.

FIG. 9 shows one manner in which the reference and multiplexing units can be adapted for digital reference control. A digital reference source 14A' is provided to supply a digital heating reference $R_h'$, while a second digital reference source 14B' is provided to supply a digital cooling reference $R_c'$. Any source of digital data may be used for sources 14A' and 14B', and each may be as simple as a hard-wired set of voltages representing ones and zeros or as complex as microprocessors responsive to external inputs, such as a keyboard for inputting data from which the pair of reference signals are calculated. For the sake of discussion, it will be assumed that the digital references $R_h'$ and $R_c'$ are octal (8-bit) digital values, but it will be clear that the way in which these values are represented is a design choice that is not critical to the invention. Depending upon whether L1C or L1H is energized (neither is shown in FIG. 9; please refer to FIGS. 4 and 6), either the output of 14C1 or 14C2 is selected as the digital reference $R_{dig}*$. (In this implementation, 14C1 and 14C2 may be octal tri-state buffers, such as 74HC244.) The digital reference may be applied directly to the variable speed control and power converter 16 (not shown in FIG. 9) if it is capable of accepting a digital reference signal, or it may be converted to a DC voltage by a digital-to-analog converter DAC1 to generate a reference voltage R* at CR1. It will be clear that many implementation details of this circuit may be modified without departing from the spirit of the invention.

One skilled in the art will appreciate that the invention is independent of motor technology and that, for example, induction, brushless permanent magnet, switched reluctance and brushed DC motors may be used in conjunction with the invention. The invention is also compatible with a variety of converter topologies, both for AC to DC and AC to AC conversion, including phase control using a thyristor full converter or semiconverter.

It will be realized that, with either a current or a voltage sensing embodiment of the invention, with a replacement blower motor that mechanically fits in the same location as the PSC motor being replaced (which generally means that the motor diameters are the same), the invention, which incorporates the variable speed replacement motor, can be used as a "drop-in" replacement for the PSC motor by using the same electrical connections as the original PSC motor, namely a common plus two hot AC line connections. Thus, no rewiring is required to obtain the advantages offered by the variable speed operation. Moreover, in the preferred embodiment, the reference source is adjustable, so the need to manufacture and stock multiple customized replacement units can be substantially reduced. The same advantage also applies for blower motor units for OEM use, and for motor speed control systems for OEM and replacement use where a suitable motor is already provided.

While the invention has been described in connection with 115 VAC distribution systems, it is not limited to 115 VAC distribution systems. One skilled in the art will recognize that, with obvious modifications of implementation details, the invention may be adapted to other power distribution systems and voltages in use in the United States and elsewhere, including, but not limited to, 230 VAC distribution systems.

The embodiments above are intended to be illustrative rather than limiting, and the particular component values and circuit topologies used to explain the invention are not to be regarded as limiting the invention in any way. It will be understood that various substitutions and modifications to this invention will be readily apparent to one skilled in the art, such modifications still being within the scope and spirit of the invention, which is not limited in scope to the particular embodiments described above, but rather by the claims below.

What is claimed is:

1. A variable speed blower motor unit comprising:
    a variable speed motor having at least two operating speeds and a reference input for selecting an operating speed;
    a power input comprising a first and a second current input, each of the current inputs coupled to the motor so that an operating current applied to either of the current inputs supplies operating power to the motor;
    a multiplexing unit coupled to the power input and the motor reference input, the multiplexing unit selecting one of at least a pair of reference signals and applying the selected reference signal to the reference input, the selection depending upon which of the first and the second current inputs has an operating current applied thereto; and
    a reference source coupled to the multiplexing unit and supplying the at least a pair of reference signals thereto.

2. The device of claim 1 wherein the variable speed motor comprises a induction motor.

3. The device of claim 1 wherein the variable speed motor comprises a brushless permanent magnet motor.

4. The device of claim 1 wherein the variable speed motor comprises a switched reluctance motor.

5. The device of claim 1 wherein the variable speed motor comprises a brushed DC motor.

6. The device of claim 1 wherein the device has the same inputs as a PSC motor in a heating, ventilation, and air conditioning unit.

7. The device of claim 1 wherein the reference source is configured to produce analog voltages as the reference signals.

8. The device of claim 1 wherein the reference source is configured to produce digital signals as the reference signals.

9. In a heating, ventilation and air conditioning unit of the type having independent power sources for heating and cooling operation, the improvement comprising a variable speed blower motor unit of the type of claim 1 wherein operating current for the first and the second current inputs is supplied from the independent power sources.

10. The device of claim 1 wherein the multiplexing unit comprises a voltage sensing unit coupled to the power input for sensing a voltage on at least a selected one of the first and second current inputs when operating power is supplied to the motor via the at least a selected one of the first and the second current inputs, and wherein the multiplexing unit selects one of the reference signals in response to the voltage sensing unit.

11. The device of claim 1 and further comprising a rectifier that electrically isolates the first and the second current inputs from one another and which is coupled to the motor so that operating power is supplied to the motor from either of the two current inputs.

12. The device of claim 1 wherein the reference source comprises a tapped resistor string voltage divider and a switch network having adjustable switch settings, the adjustment of which determines values of the reference signals.

13. The device of claim 1 wherein the multiplexing unit comprises a current sensing unit coupled to the power input for sensing the presence of an operating current flowing in at least a selected one of the first and second current inputs when operating power is supplied to the motor via the at least a selected one of the current inputs, and wherein the multiplexing unit selects one of the reference signals to apply to the reference input in response to the current sensing unit.

14. The device of claim 13 and further comprising a rectifier that electrically isolates the first and the second current inputs from one another, and which is coupled to the motor so that operating power is supplied to the motor from either of the two current inputs.

15. The device of claim 13 and further comprising a DC power supply connected to the multiplexing unit that supplies power to at least a portion of the multiplexing unit when an operating current is supplied via the at least a selected one of the current inputs.

16. The device of claim 1 wherein the multiplexing unit comprises:
    a voltage attenuator/buffer unit having an output for driving a logic circuit and an input coupled to the power input; and
    a logic circuit coupled to the output of the voltage attenuator/buffer unit, the logic circuit comprising a transmission gate responsive to the output of the voltage attenuator/buffer unit for selecting one of the reference signals.

17. The device of claim 16 wherein the logic circuit includes means for rejecting a ripple voltage from the output of the voltage attenuator and buffer.

18. The device of claim 1 wherein the reference source comprises a function generator.

19. The device of claim 18 wherein the function generator is responsive to an external sensor for varying at least one of the reference signals supplied by the reference source.

20. The device of claim 19 wherein the at least a pair of reference signals are digital reference signals, the multiplexing unit selects one of the at least a pair of digital reference signals, and the device further comprises:
    an analog to digital converter responsive to the selected digital reference signal to convert the selected digital reference signal into an analog voltage that is applied to the reference input of the motor.

21. A variable speed control for a motor comprising:
    a power input comprising a first and a second current input for coupling to a variable speed motor so that an operating current applied to either of the two current inputs supplies operating power to the motor;
    a multiplexing unit coupled to the power input for selecting one of at least a pair of reference signals to appear at an output of the multiplexing unit for application to a reference input of the motor, the selection depending upon which of the first and the second current inputs has an operating current applied thereto; and
    a reference source coupled to the multiplexing unit and supplying the at least a pair of reference signals to the multiplexing unit.

22. The device of claim 21 wherein the reference source is configured to produce analog voltages as the reference signals.

23. The device of claim 21 wherein the reference source is configured to produce digital signals as the reference signals.

24. The device of claim 21 wherein the reference source comprises a tapped resistor string voltage divider and a switch network having adjustable switch settings, the adjustment of which determines values of the reference signals.

25. The device of claim 21 and further comprising a rectifier that electrically isolates the first and the second current inputs from one another and which is coupled to the motor so that operating power is supplied to the motor from either of the two current inputs.

26. The device of claim 21 wherein the multiplexing unit comprises a voltage sensing unit coupled to the power input for sensing a voltage on at least a selected one of the first and second current inputs when operating power is supplied to the motor via the at least a selected one of the current inputs, and wherein the multiplexing unit selects one of the reference signals to couple to the reference input in response to the voltage sensing unit.

27. The device of claim 21 wherein the multiplexing unit comprises a current sensing unit coupled to the power input for sensing the presence of an operating current flowing in at least a selected one of the first and second current inputs when operating power is supplied to the motor via the at least a selected one of the current inputs, and wherein the multiplexing unit selects one of the reference signals to apply to the reference input in response to the current sensing unit.

28. The device of claim 27 and further comprising a rectifier that electrically isolates the first and the second current inputs from one another and which is coupled to the motor so that operating power is supplied to the motor from either of the two current inputs.

29. The device of claim 27 and further comprising a DC power supply connected to the multiplexing unit and which supplies power to at least a portion of the multiplexing unit when an operating current is supplied via the at least a selected one of the current inputs.

30. The device of claim 21 wherein the multiplexing unit comprises:
   a voltage attenuator/buffer unit having an output for driving a logic circuit and an input coupled to the power input; and
   a logic circuit coupled to the output of the voltage attenuator/buffer unit, the logic circuit comprising a transmission gate responsive to the voltage attenuator/buffer unit for selecting one of the reference signals.

31. The device of claim 30 wherein the logic circuit includes means for rejecting a ripple voltage from the output of the voltage attenuator/buffer unit.

32. The device of claim 21 wherein the reference source comprises a function generator.

33. The device of claim 32 wherein the function generator is responsive to an external sensor for varying at least one of the reference signals.

34. The device of claim 33 wherein the at least a pair of reference signals are digital reference signals, the multiplexing unit selects one of the at least a pair of digital reference signals, and the device further comprises:
   an analog to digital converter responsive to the selected digital reference signal to convert the selected digital reference signal into an analog voltage for application to the reference input of the motor.

35. A variable speed blower motor unit having a plurality of modes of operation comprising:
   a variable speed motor having at least two operating speeds and a reference input for selecting an operating speed;
   at least two current inputs coupled to the motor, each of said current inputs corresponding to a selected mode of blower operation;
   a reference source for supplying a reference signal corresponding to a desired speed for each mode of blower operation; and
   a multiplexing unit connected between the current inputs, the reference source, and the motor reference input for sensing which current input is activated, and for applying the corresponding reference signal to said motor reference input to thereby select the blower speed corresponding to the selected mode of blower operation.

36. The device of claim 35 wherein the reference source is configured to permit each reference signal to be adjusted to thereby adjust the blower speed for each mode of blower operation.

37. The device of claim 36 further comprising a rectifier for electrically isolating the current inputs from each other.

38. The device of claim 37 wherein the rectifier rectifies power supplied from either of said current inputs for supply to said motor.

39. A method of controlling a variable speed motor comprising the steps of:
   (a) generating a plurality of reference signals for application to a reference input of the motor;
   (b) supplying operating power to the motor via one of a plurality of current inputs;
   (c) selecting one of the plurality of reference signals for application to the reference input of the motor in accordance with which one of the plurality of current inputs is supplying operating power to the motor; and
   (d) applying the selected one of the plurality of reference signals to the reference input of the motor to thereby select an operating speed of the motor.

40. The method of claim 39 wherein the selecting step comprises the step of sensing current flowing in the current inputs.

41. The method of claim 39 wherein the selecting step comprises the step of sensing voltage on the current inputs.

42. The method of claim 39 wherein the generating step comprises the step of varying at least one of the reference signals in accordance with a signal from a sensor.

43. The method of claim 39 and further including the step of electrically isolating the plurality of current inputs from one another.

44. A method of operating a motor having a plurality of modes of operation, the method comprising the steps of:
   (a) generating a plurality of reference sources for application to a reference input of the motor;
   (b) supplying operating power to the motor via one of a plurality of current inputs, each of the current inputs corresponding to a selected mode of operation of the motor;
   (c) selecting one of the plurality of reference signals to apply to the reference signal input of the motor; and
   (d) applying the selected reference signal to the reference signal input of the motor to thereby operate the motor in a mode of operation corresponding to the current input to which power is supplied.

45. The method of claim 44 and further comprising the step of electrically isolating the current inputs from one another.

46. The method of claim 44 and further comprising the step of varying at least one of the plurality of reference signals in accordance with a signal supplied by a sensor.

* * * * *